April 24, 1945.　　　D. S. KENNEDY　　　2,374,355
NONSKID CHAIN
Filed May 20, 1944
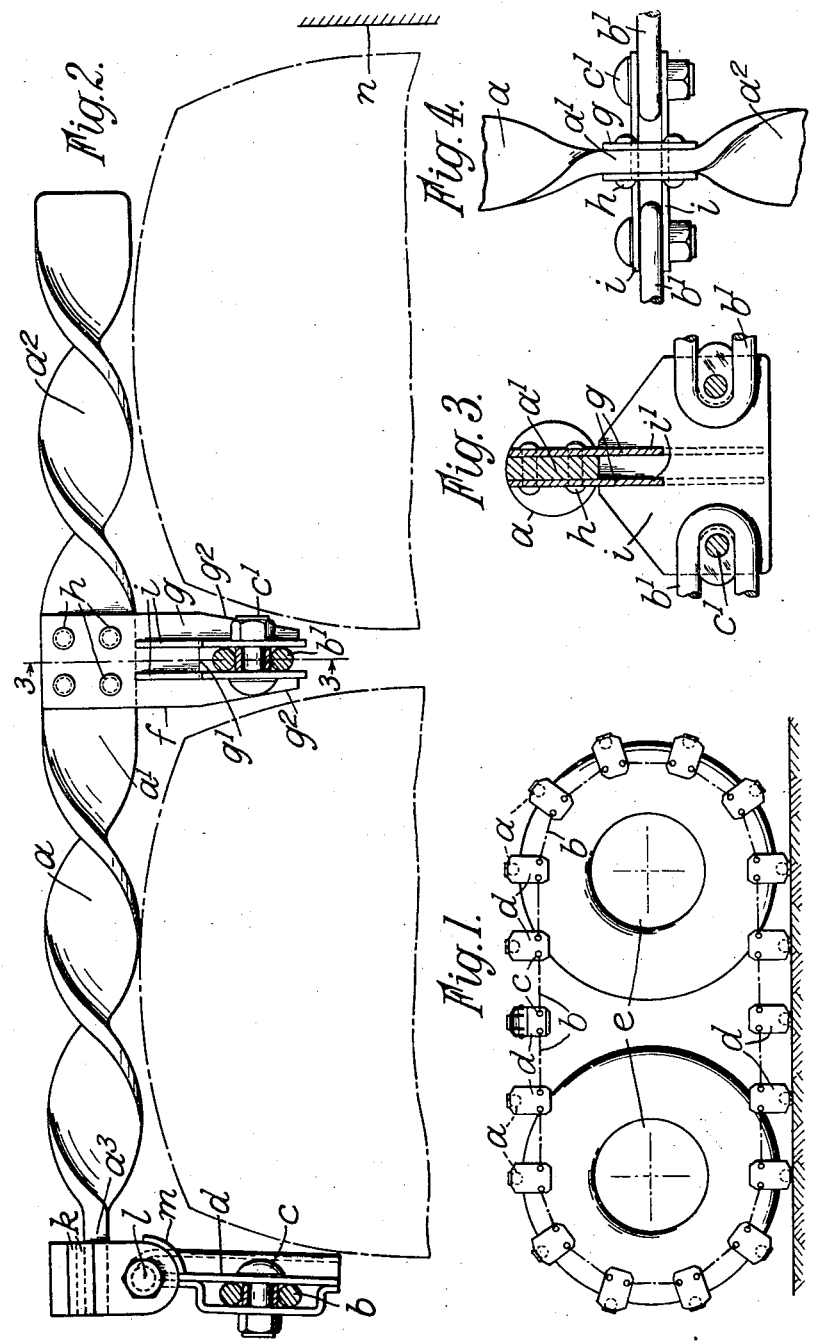
Inventor
DONALD STUART KENNEDY
ATTORNEY Patented Apr. 24, 1945

2,374,355

UNITED STATES PATENT OFFICE 2,374,355

NONSKID CHAIN

Donald Stuart Kennedy, Longparish, Andover, England

Application May 20, 1944, Serial No. 536,472
In Great Britain May 14, 1943

8 Claims. (Cl. 305—8)

This invention relates to non-skid girdle or overall chains for twin-tired wheels of road vehicles.

The invention has for its main object to provide an improved non-skid chain of this type, more particularly for use upon vehicles fitted with twin-tires of very large section and having very little clearance between the inside tires and the vehicle body or chassis, so that it is difficult to fit the customary non-skid overall chains having their transverse shoes or tread members coupled together by connecting or retaining chains engaging lateral wings or flaps pivoted at both ends of the tread members.

It is already known to provide six-wheeled vehicles having four twin-tired driving wheels with overall chains comprising transverse tread members coupled together by connecting chains or linkages attached to central projections or guide members which penetrate between the twin tires; it is, however, found in practice that with tires of very large section, for example 12 inch by 20 inch twin-tires, the shoes or tread members have a tendency to pivot upon the single line of connecting links and to swing out of their transverse position into the central plane of the wheel, that is, across or perpendicular to the required position for leading on to the forward wheel.

An important object of the present invention is to provide an improved overall non-skid chain in which the connecting chains attached to guide members penetrating between the twin-tires are associated with side connecting chains attached to the outer ends of the tread members, so that the latter are supported in the manner of overhanging cantilevers, and their pivotal movement is controlled to ensure that the overall chain leads properly from one wheel to the other.

Other objects and advantages of the invention will hereinafter appear from the following description of a preferred embodiment, reference being made therein to the accompanying drawing, in which:

Fig. 1 is a diagram showing the improved nonskid chain fitted as an overall chain.

Fig. 2 is a sectional view showing the twin tires of one wheel with a single shoe or transverse tread member, the lateral flap pivoted thereto, and the rigid member or tongue which penetrates between the twin tires.

Fig. 3 is a detail of the tongue in section on the line 3—3 of Fig. 2.

Fig. 4 is a plan of the tongue.

As shown diagrammatically in Fig. 1, the device consists of an overall chain comprising a plurality of shoes or tread members $a$ coupled together by side connecting chains $b$, each short length of which is secured as by bolts $c$ to the pivoted side flaps $d$ of adjacent shoes; the overall chain passes around the tires of two wheels $e$ arranged in tandem, the shoes $a$ extending transversely of the tire treads with which they are in engagement. A complete overall chain for a pair of twin-tired wheels of size 12 inch by 20 inch, with the wheel centers spaced at 52 inches apart, may comprise twenty shoes evenly distributed along the connecting chains, which are provided with suitable coupling and adjusting means (not shown).

Referring to Figs 2-4, each shoe $a$ consists of a twisted element such as described in my prior Patents Nos. 2,095,523 and 2,283,264, but having a flat or untwisted portion $a^1$ at about the middle of its length, a pivoted side flap $d$ at one end only of the element for engaging the connecting chain $b$ on the side remote from the vehicle, and its other end $a^2$ extending only partly across the tread of the inner tire, as shown on the right of Fig. 2; this inner end of the element has its corners and edges rounded off, and its length may be for example ten inches, as compared with fourteen inches for the outer end, measured in each case from the central plane of the wheel, for tires of 12 inch section.

To the flat median portion $a^1$, which stands at right angles to the line of the connecting chain $b$, there is fixed a rigid member or tongue $f$ which penetrates into the space between the twin tires while the shoe engages transversely across the treads; this rigid tongue $f$ is fitted to a second connecting chain $b^1$, running on substantially the same pitch lines as the outside connecting chain $b$ and likewise made in short lengths secured as by bolts $c^1$ to the tongue $f$.

The rigid member or tongue is conveniently built up from metal strips or plates, jointed together crosswise in intersecting pairs, two strips or narrow plates $g$ being riveted at $h$ to the opposite faces of the flat portion $a^1$ of the element, and two wide plates $i$ being fitted at right angles to the first pair; the strips $g$ have their projecting ends slotted longitudinally at $g^1$ and their edges $g^2$ are slightly bevelled to clear the walls of the tires when in position. The plates $i$, which are drilled to receive the bolts $c^1$ for clamping the connecting chain $b^1$ between them, are fitted into the slots $g^1$ of the metal strips, the plates $i$ being formed with pairs of narrow slots $i^1$ to engage the thickness of the strips $g$ up to the edge of the twisted element $a$; the assembly of slotted strips and plates, intersectingly interengaged in the manner of the slotted partitions used in egg-boxes and the like, may be welded into a rigid integral unit before being riveted to the transverse twisted element or tread member $a$.

The pivoted side flap $d$ at the opposite end of the shoe may be of any suitable construction, for example as described in the above-mentioned patent specifications; it may be attached to the shoe by means of channel-shaped pieces $k$ through the flanges of which the pivot pin $l$ is passed. The webs of the channels $k$ are riveted to the extremital tab $a^3$ of the twisted element; the inward movement of the side flap towards the tire is limited by a stop piece $m$ welded upon the channels.

In operation, the two connecting chains $b$ and $b^1$ maintain the position of the shoes so that they engage in a proper manner with the tires, the shoes being prevented from swinging out of their transverse position while travelling from the rear wheel to the forward one; the relatively short length of the inner end of the shoe or twisted element, with the absence of any connecting chain on this inner side of the wheels, removes all danger of the overall chain fouling the chassis $n$.

Thus the present invention overcomes the difficulty of fitting non-skid chains to twin-tired wheels of vehicles having poor clearance between the chassis and the tires, and this is effected by the use of a rigid attachment to a central chain or linkage together with a pivotal attachment to an outside chain or linkage, leaving the inside of the wheel clear. The transverse tread members are accordingly held in their operative position across the twin-tire treads by rigid central guide members and pivoted or steadying members bearing against the outer wall of the outside tire. This arrangement leaves the inside end of the shoe or transverse tread member free to extend at least partly across the inner tire of the wheel, without fouling the chassis beside the said inner tire, however small the clearance provided between them.

The rigid member for engaging the second connecting chain is fixed to the shoe or transverse tread member so as to penetrate into the space between the twin tires, the two connecting chains being spaced at a suitable distance apart on opposite sides of the outer tire.

What I claim is:

1. In a non-skid chain of the type described, the combination of a plurality of shoes adapted to extend across the tread of the outer tire and at least partly across the tread of the inner tire, pivoted wings attached to the outer ends of said shoes, rigid members secured to said shoes at about the middle of their length, a side connecting chain engaging said wings, and a second connecting chain engaging said rigid members, said rigid members being adapted to penetrate between the twin tires and to guide said second connecting chain substantially in the central plane of the wheels, while said side connecting chain maintains said shoes substantially perpendicular to the said plane.

2. In an overall non-skid chain of the type described, the combination of a plurality of shoes adapted to extend across the treads of the outer tires in turn and at least partly across the treads of the inner tires, pivoted wings attached to the outer ends of said shoes, rigid members secured to said shoes at about the middle of their length, a side connecting chain engaging said wings, and a second connecting chain engaging said rigid members, said rigid members being adapted to penetrate between the twin tires and to guide said second connecting chain substantially in the central planes of the respective wheels, while said side connecting chain maintains said shoes substantially perpendicular to said central planes in the passage from one to the other of said wheels.

3. In a non-skid chain for twin-tired vehicle wheels, a shoe adapted to extend across the tread of the outer tire and at least partly across the tread of the inner tire, a pivoted wing attached to the outer end of said shoe, a rigid member secured to said shoe at about the middle of its length, a side chain engaging said wing, and a second chain engaging said rigid member, said rigid member being adapted to penetrate between said outer and inner tires, and said chains running in substantially parallel lines on opposite sides of said outer tire.

4. In a non-skid chain for twin-tired vehicle wheels, a shoe adapted to extend across the tread of the outer tire and at least partly across the tread of the inner tire, said shoe consisting of a tiwsted metal element having at about the middle of its length a short flat portion, a pivoted wing attached to the outer end of said element, a rigid member secured to the flat portion of said element, a side chain engaging said wing, and a second chain engaging said rigid member, said rigid member being adapted to penetrate between said outer and inner tires, and said chains running in substantially parallel lines on opposite sides of said outer tire.

5. In a non-skid chain for twin-tired vehicle wheels, a shoe adapted to extend across the tread of the outer tire and at least partly across the tread of the inner tire, a pivoted wing attached to the outer end of said shoe, a rigid member secured to said shoe at about the middle of its length, said rigid member being built up from metal plates jointed together crosswise in intersecting pairs, a side chain engaging said wing, and a second chain clamped between two of said metal plates, said rigid member being adapted to penetrate between said outer and inner tires, and said chains running in substantially parallel lines on opposite sides of said outer tire.

6. In a non-skid chain for twin-tired vehicle wheels, a shoe adapted to extend across the tread of the outer tire and at least partly across the tread of the inner tire, said shoe consisting of a twisted metal element having at about the middle of its length a short flat portion, a pivoted wing attached to the outer end of said element, a rigid member secured to the flat portion of said element, said rigid member being built up from four metal plates jointed together crosswise in intersecting pairs, two of said metal plates fitting against the flat portion of said element to which they are secured, a side chain engaging said wing, and a second chain clamped between the other two of said metal plates, said rigid member being adapted to penetrate between said outer and inner tires, and said chains running in substantially parallel lines on opposite sides of said outer tire.

7. In a non-skid chain of the type described, the combination of a plurality of shoes adapted to extend across the tread of the outer tire and at least partly across the tread of the inner tire, pivoted wings attached to the outer ends of said shoes, a side chain engaging said wings to connect the outer ends of said shoes in series circumferentially of the outer tire, a second chain running in a line substantially parallel to said side chain but on the inner side of said outer tire, and rigid means securing said shoes to individual points of said second chain.

8. In a non-skid chain of the type described, a shoe adapted to extend across the tread of the outer tire and at least partly across the tread of the inner tire, a side chain, a pivotal attachment of said side chain to the outer end of said shoe, a second chain running substantially parallel to said side chain but located between the two tires, and a rigid attachment of said second chain to about the middle of said shoe, said pivotal and rigid attachments of said chains supporting said shoe in the manner of a cantilever transversely to the tread of said outer tire so as to overhang the tread of said inner tire.

DONALD STUART KENNEDY.